(12) United States Patent
Caylor et al.

(10) Patent No.: US 9,404,754 B2
(45) Date of Patent: Aug. 2, 2016

(54) AUTONOMOUS RANGE-ONLY TERRAIN AIDED NAVIGATION

(71) Applicant: Raytheon Company, Waltham, MA (US)

(72) Inventors: Thomas Lee Caylor, Tucson, AZ (US); James Thomas Landon, Oro Valley, AZ (US); George Jeffrey Geier, Tucson, AZ (US)

(73) Assignee: Raytheon Company, Waltham, MA (US)

(*) Notice: Subject to any disclaimer, the term of this patent is extended or adjusted under 35 U.S.C. 154(b) by 772 days.

(21) Appl. No.: 13/850,055

(22) Filed: Mar. 25, 2013

(65) Prior Publication Data
US 2016/0047657 A1     Feb. 18, 2016

(51) Int. Cl.
G01C 21/20     (2006.01)
G01C 21/00     (2006.01)
G05D 1/00      (2006.01)

(52) U.S. Cl.
CPC .............. *G01C 21/005* (2013.01); *G01C 21/20* (2013.01); *G05D 1/0088* (2013.01)

(58) Field of Classification Search
CPC combination set(s) only.
See application file for complete search history.

(56) References Cited

U.S. PATENT DOCUMENTS

| 3,328,795 | A | | 6/1967 | Hallmark |
|---|---|---|---|---|
| 4,939,663 | A | * | 7/1990 | Baird ................... G01C 21/005 342/64 |
| 5,189,424 | A | * | 2/1993 | Brown ................ G01S 13/9023 342/25 C |
| 6,218,980 | B1 | | 4/2001 | Goebel et al. |
| 6,512,976 | B1 | | 1/2003 | Sabatino et al. |
| 7,522,090 | B2 | | 4/2009 | Hawkinson |
| 2002/0188386 | A1 | * | 12/2002 | Day ........................ G01S 13/86 701/4 |
| 2005/0273257 | A1 | * | 12/2005 | Hager .................. G01C 21/005 701/500 |

OTHER PUBLICATIONS

Golden, Joe P., "Terrain contour matching (TERCOM): a cruise missile guidance aid," SPIE vol. 238 Image Processing for Missile Guidance (1980), pp. 10-18.
Wilkinson et al., "Latest Developments of the TERPROM® Digital Terrain System 2009," Joint Navigation Conference, Orlando, Florida, USA, Jun. 1-4, 2009, pp. 1-16.
Fountain J.R., "Digital Terrain Systems," 1997,The Institution of Electrical Engineers.
Reed et al., "The range only correlation system," SPIE vol. 238 Image Processing for Missile Guidance (1980), pp. 42-49.
Riedel et al., "Guidance and Navigation in the Global Engagement Department," Johns Hopkins APL Technical Digest, vol. 29, No. 2 (2010), pp. 118-132.

* cited by examiner

*Primary Examiner* — Edward J Pipala
(74) *Attorney, Agent, or Firm* — Eric A. Gifford

(57) ABSTRACT

AROTAN provides for autonomous terrain aided navigation that is fully independent of the position uncertainty of the vehicle during flight. AROTAN aligns a grid to the search space and periodically updates the search space during the measurement history to account for growth in position uncertainty. AROTAN computes terrain sufficiency statistics for a moving history to provide robust criteria for when to perform the correlation. A post-correlation refinement provides an additional correction of the horizontal position error and a correction of the altitude. AROTAN can quickly provide the vehicle's location based on the correlation from a single measurement history.

21 Claims, 9 Drawing Sheets

AUTONOMOUS RANGE-ONLY TERRAIN AIDED NAVIGATION

BACKGROUND OF THE INVENTION

1. Field of the Invention

This invention relates to terrain aided navigation, and more particularly to autonomous range-only terrain aided navigation, that generates range predictions based on a model of the radar altimeter on a grid aligned to a search space that varies dynamically over a moving measurement history and upon satisfaction of terrain sufficiency criteria correlates the range predictions to the measurement history using a terrain height database with a format that is independent of the flight characteristics.

2. Description of the Related Art

Terrain Contour Matching (TERCOM), first developed in the 1950's and patented under U.S. Pat. No. 3,328,795, uses radar altimeter measurements to compute a history of terrain heights and correlates that history with terrain heights from a database map. TERCOM has been used for cruise missiles. The main limitation of TERCOM is the labor-intensive preparation to tailor a set of terrain maps for each mission. The map height grid points, or cells, are aligned with the downtrack/crosstrack direction of a predetermined flight path and the spacing of the cells is the same as the spacing of the measurements with little angling or spacing discrepancy allowed (6:25-28, 14:7). The missile is constrained to straight flight at a certain speed while taking the measurements. A further constraint stems from the assumption that the radar altimeter provides the range to the terrain directly below the vehicle. In reality a conventional radar altimeter provides the range to the closest terrain in the radar beam called the "first return". Conventional radar altimeters do not provide a bearing angle to the closest terrain. When this first return is not directly below the vehicle, it results in a terrain height that does not correspond to the terrain height associated with the vehicle's position in the database. This can cause false correlations. This further constrains TERCOM position corrections to be taken over terrain that is not likely to produce these false correlations, but at the same time has sufficient uniqueness to provide a good correlation. This requires detailed analysis of each mission and its associated terrain and limits the flexibility of mission planning. This work can be reduced by limiting the number of TERCOM position corrections and augmenting the navigation solution with other sensors, and eventually using GPS.

An improvement to TERCOM developed by John Hopkins University Applied Physics Laboratory (APL) used a reference map transform. At the mission planning and map generation stage, a first return radar altimeter model is run over the terrain at the planned clearance height, and the height associated with the first return is substituted into the cell corresponding to each possible horizontal vehicle position in the TERCOM map. These heights match the first return heights more closely. This resulted in a position correction with reduced errors and fewer false correlations. However, computing this reference map transformation involves a lot of pre-mission work and does not solve the problem that the mission is constrained to a particular clearance height, heading and speed.

U.S. Pat. No. 6,218,980 suggests performing a reference map transformation, similar to APL's reference map transform, with a radar altimeter model during flight as a function of current clearance height, applying this to a conventional TERCOM map. It is claimed that this allows for proper terrain correlation at high altitudes. Another improvement allowed for terrain correlation over a curved flight path. This approach still requires the cells to be given in downtrack/crosstrack coordinates and with a spacing corresponding to a particular vehicle speed, thus still requiring the generation of mission-specific maps before each mission.

U.S. Pat. No. 7,522,090 suggests a modification to the conventional TERCOM that allows for the use of a terrain height database that can be formatted independently of the flight path. A reference basket is calculated onboard from the horizontal position uncertainty, and sample points comprising the horizontal position and altitude sample (i.e. the difference between the vertical inertial altitude and the clearance altitude at the horizontal position) are correlated over the reference basket. The sample history continues to grow until a satisfactory correlation can be achieved. The reference basket is a set of cells in the terrain database and remains constant over the history.

Honeywell developed an interferometric radar sensor and associated algorithm called Precision Terrain Aided Navigation (PTAN), patented under U.S. Pat. No. 6,512,976. This has an advantage over the previous methods discussed above in that it provides more precise measurements, and in particular provides not only the range to the nearest terrain, but also bearing angles. Locating a terrain feature with an accuracy that is finer than the resolution of the terrain database allows for a more accurate position fix. A disadvantage is that the sensor and associated processing equipment and algorithms are very complex. PTAN requires three antennas with a significant special separation to get the full angular information, which limits its use to vehicles that are large enough to accommodate this spacing. Furthermore, PTAN requires expensive calibration of the boresight angles to a high accuracy.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides for autonomous range-only terrain aided navigation of airborne vehicles that uses generic terrain height databases and requires only range measurements of the type provided by conventional radar altimeters. This approach does not use or require pre-planned mission-specific terrain maps, hence is applicable to a much broader class of airborne vehicles. The approach does not require external signals such as GPS nor does it require angle measurements that necessitate additional antennas and boresight calibration although such additional information can be incorporated if available. The requirement of only one antenna assembly, rather than multiple antennas with significant special separation, allows this approach to be used with small vehicles. This approach may be implemented with the hardware available on existing navigation systems comprising only an IMU, a radar altimeter, the terrain database and the navigation processor. This approach solves the problem of obtaining the vehicle's location quickly when the initial location uncertainty is large and allows for continuous corrections throughout flight.

In an embodiment of autonomous range-only terrain aided navigation a terrain height database comprising heights of terrain at given locations from a terrain reference is loaded onto the vehicle. The database is formatted independently of a flight path of the airborne vehicle over the terrain (e.g. heights formatted in latitude and longitude). A two-dimensional search space is initialized about a horizontal position estimate of the airborne vehicle based on the uncertainty of that estimate. During flight the vehicle gathers a history of range-only measurements from the vehicle to the terrain. An indexed grid is aligned to the search space. For each measurement, the vehicle calculates range predictions from the updated altitude estimate and from terrain heights in the database for hypothetical positions of the vehicle on the indexed grid about the updated horizontal position estimate. The range predictions are calculated directly from the generically formatted terrain heights in the database without the terrain heights first being aligned according to any flight path or spaced according to any vehicle speed or transformed according to any altitude. The search space is periodically updated over the measurement history and grows with the uncertainty of the updated horizontal position estimate. The vehicle performs a correlation between the history of range-only measurements and the history of range predictions to determine a correlation offset corresponding to the best correlation. The vehicle uses the correlation offset to generate a position estimate correction and an uncertainty correction. The process is repeated, suitably continuously, to provide autonomous terrain aided navigation corrections as the vehicle flies over the terrain.

In an embodiment, the grid is aligned to the search space for each history by computing the covariance matrix of the two-dimensional horizontal position estimate at the start of or just prior to gathering the history. First and second eigenvectors of the covariance matrix are computed to define first and second principal axes of the search space. The square roots of the first and second eigenvalues of the covariance matrix are multiplied by a scale factor to determine an initial size of the search space. The axes of the grid are aligned to the first and second principal axes of the search space. The spacing between indices along the axes of the grid is selected to define the resolution. One or more times over the history, the covariance matrix is recalculated to update the search space. Without changing the orientation or spacing of the grid, indices are added to the grid to cover the updated search space. Range predictions are calculated for any additional indices in the grid for earlier position estimates in the history In an embodiment, the correlation is performed when a terrain sufficiency statistic computed from the terrain heights satisfies terrain sufficiency criteria. The terrain sufficiency statistic is suitably computed for a history of the last N measurements.

In an embodiment, the range predictions and the correlation are performed iteratively about the correlation offset with a decreasing grid spacing and decreasing search space. In a first iteration, the range predictions are suitably performed on a coarse grid that spans the entire search space centered about the horizontal position estimate. The horizontal position estimate is corrected based on the first correlation. In the second iteration, the range predications are suitably performed on a more finely resolved grid that spans a portion of the search space centered about the correlation offset and so forth until a stopping criterion is satisfied. The size of the search space will shrink as uncertainty is removed from the horizontal position estimate.

In an embodiment, a post-correlation refinement is made to improve the accuracy of the correction beyond the correlation level. The correlation offset is used to select a correlation history of range predictions and a corresponding three-dimensional range prediction vector. A difference vector between the range measurements and the selected range predictions and line-of-sight unit vectors from the three-dimensional range prediction vector and correlation history of range predictions are computed. The difference vector and the line-of-sight unit vectors are used to compute a three-dimensional offset from the correlation offset that minimizes the differences over the history. The three-dimensional offset is added to the correlation offset to provide a correction to the horizontal position estimate as well as the altitude estimate of the vehicle. The covariance is recalculated to correct the uncertainty as a result of the correlation results.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
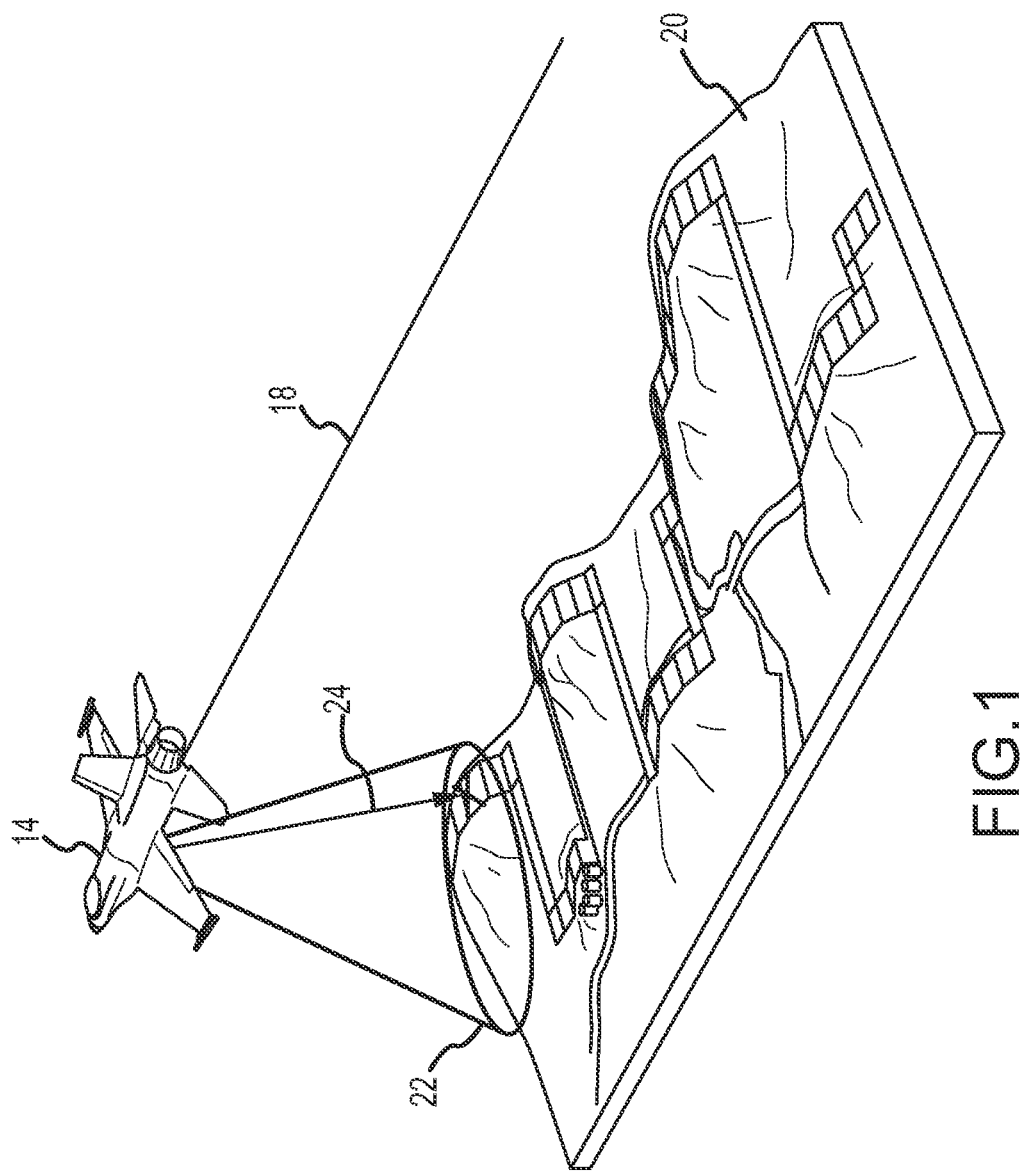
FIG. 1 is a diagram illustrating a history of range-only measurements from a radar altimeter of an airborne vehicle.
Figure 2:
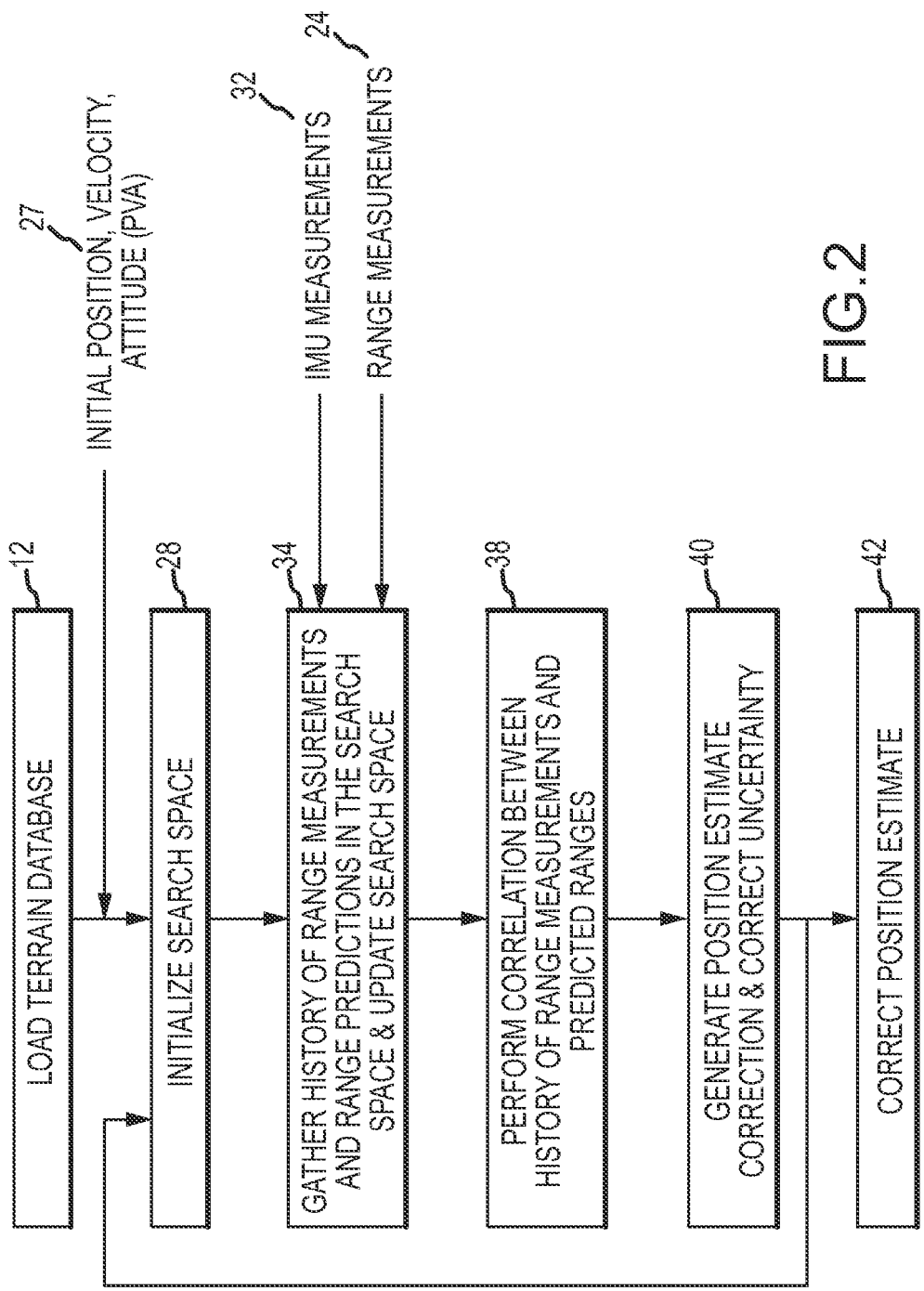
FIG. 2 is a flow diagram of an embodiment of autonomous range-only terrain aided navigation.

Neither conventional TERCOM nor any of the range-only improvements to TERCOM allow the format of terrain height maps or database to be fully independent of the flight of the vehicle. Even if the vehicle's current uncertainty basket inside which the correlation is performed were to be calculated during flight from the estimated position uncertainty, in all prior attempts the size of the uncertainty basket is held constant over the history of the radar altimeter measurements used for the correlation, which does not account for any growth of the position error over the measurement history. If the distance between the true position of the vehicle and the estimated position drifts outside of the original uncertainty basket, then the algorithm may correlate to an erroneous solution. Also, in all prior range-only methods, the spacing used in the terrain height maps or database is the same as the spacing used in correlation process, and therefore must be managed carefully to allow the correlation to function properly. For example, if the longitude spacing changes with changing latitude, the correlation performance changes, and the correlation could fail if there is a sudden change in spacing. In addition, none of the prior attempts enable a robust means of autonomously evaluating the goodness of the correlation during flight, which are called "terrain sufficiency statistics" herein. All prior attempts use correlation goodness methods in which the length of the history used in the correlation is either tailored during mission planning of each flight, or is allowed to grow indefinitely. The latter may result in the measurement history length used in the correlation being so long that the error growth over time results a correlation to an erroneous solution. None of the above prior attempts enable a valid correction of altitude with a conventional single-look radar altimeter. Since conventional radar altimeters provide a first return range, assuming this range is directly below the vehicle produces an erroneous altitude correction. Finally, none of the prior attempts solve the problem of obtaining the vehicle's location quickly when the initial location uncertainty is large, since in that case they require several iterations of gathering data and correlating to increasingly finer pre-prepared terrain maps based on simulated uncertainties.

Autonomous Range-Only Terrain Aided Navigation ("AROTAN") provides for terrain-aided navigation that is fully independent of the position uncertainty of the vehicle during flight including flight path, speed and altitude. AROTAN aligns a grid to the uncertainty basket or "search space" as referred to herein. The search space is periodically updated during the measurement history to account for growth in the position uncertainty. AROTAN computes terrain sufficiency statistics for a moving history to provide robust criteria for when to perform the correlation. A post-correlation refinement provides an additional correction of the horizontal position error and a correction of the altitude. Finally AROTAN quickly provides the vehicle's location based on the correlation from a single measurement history.

The present invention provides for autonomous terrain aided navigation of airborne vehicles over a terrestrial surface, without the aid of external signals such as GPS, requiring only measurements of range to the surface, and a generically formatted database of terrain heights. No mission-specific terrain maps are needed, enabling continued navigation with on-the-fly changes in flight path wherever terrain height data is available. The use of a conventional range-only radar altimeter enables precise navigation position accuracy quickly and continuously over terrain in all weather conditions.

This approach is applicable to a much broader class of airborne vehicles such as manned or unmanned aircraft that do not follow pre-established flight paths as well as cruise missiles, reentry vehicles and certain remote pilot vehicles that follow a pre-established flight path. The approach allows traditional vehicles such as the cruise missile to be operational without delay and to be re-tasked during flight. The approach does not require external signals such as GPS nor does it require angle measurements that necessitate additional antennas and boresight calibration although such additional information can be incorporated if available. This approach may be implemented with the minimum hardware available on existing systems including an IMU, a radar altimeter, the terrain database and the navigation processor. This approach solves the problem of obtaining the vehicle's location quickly when the initial location uncertainty is large and allows for continuous corrections throughout flight.

Referring now to the drawings, an embodiment of Autonomous Range-Only Terrain Aided Navigation (AROTAN) is illustrated in FIGS. 1 through 4. A terrain database 10 is loaded (step 12) onto an airborne vehicle 14. The terrain height 10 database used by AROTAN is structured in a generic way that is independent of a flight path 18 of the vehicle over terrain 20. The database 10 comprises the heights of terrain at given locations 16 from a terrain reference. One example of such a terrain height database format is Digital Terrain Elevation Data (DTED), which is ordered by latitude and longitude. DTED uses Mean Sea Level (MSL) as a terrain reference, and the locations along latitude or longitude of all adjacent terrain heights within a given one-by-one degree block have a constant spacing in latitude or longitude, thus forming a two-dimensional grid of terrain heights. Another example of a generic terrain height database format orders the heights on a two-dimensional grid aligned with the Universal Transverse Mercator (UTM) coordinate system and uses the World Geodetic System (e.g. WGS84) as the terrain reference.

The particular database 10 or portion of a database 10 that is loaded onto airborne vehicle 14 may contain only the terrain heights in the areas needed for the theater of operations or possible flight paths but the structure or format of the database is not altered or transformed based on a particular flight path. AROTAN uses terrain heights in the vicinity of the vehicle's estimated flight path. Thus, only the terrain heights for the area or areas covering all possible flight paths and associated uncertainties of the vehicle need to be loaded into the database. The uncertainty region covers all locations where terrain heights might be used by AROTAN, which is a function of uncertainties in the position estimate and can include other effects such as the beamwidth of the radar altimeter. However, more data than necessary can be loaded for ease of access and planning. For example, the same database may be loaded onto multiple airborne vehicles flying different missions in the theater of operations.

Airborne vehicle 14 is depicted here as a manned aircraft. Alternately, the vehicle may be an unmanned aerial vehicle (UAV), a guided missile, a re-entry vehicle (RV) or any other airborne vehicle that requires terrain aided navigation. The vehicle may fly any flight path within the confines of the database. The flight path may be pre-programmed prior to flight, may be retasked during flight or may be at a pilot's discretion. Airborne vehicle 14 only requires a minimum navigation hardware package include the database 10, an Inertial Measurement Unit (IMU), a radar sensor and a navigation processor to implement AROTAN. The radar sensor is suitably a conventional range altimeter that provides only a range measurement to the terrain below. The range altimeter illuminates the terrain 20 with a radar beam 22, typically Ku, C, S or Ka band, and processes the return to provide a range measurement 24. The radar altimeter is suitably a conventional radar altimeter that is configured to provide a "first return" range, roughly the range to the nearest terrain in beam 22 as depicted in FIG. 1. As shown, the first return range measurement 24 does not necessarily track the terrain directly below flight path 18. The navigation package may include other components such as a GPS receiver, barometric altimeter, magnetometer or star tracker as the application warrants.

The navigation processor receives an initial position, velocity and attitude (PVA) 27 of the vehicle from an external source (e.g. operator input or transfer alignment) and initializes a search space 26 (step 28) about the initial horizontal position estimate 30. Search space 26 is a two-dimensional region in a horizontal plane about the latest horizontal position estimate in which the actual horizontal position of the vehicle is likely to reside. The search space is a function of the uncertainty of the latest horizontal position estimate. The orientation of the search space is a function of the relative uncertainty of the two dimensions.

The navigation processor receives range measurements 24 and IMU measurements 32 to gather a history of range measurements and range predictions for hypothetical vehicle positions in search space 26 and update the search space (step 34). The navigation processor integrates the IMU measurements 32 to update the horizontal position estimate 36 and the altitude estimate. For each range measurement, the navigation processor positions the search space 26 about the corresponding horizontal position estimate 36 at the current altitude estimate and calculates range predictions from terrain heights in the database for hypothetical positions of the vehicle in the search space. The navigation processor implements a model of the radar altimeter to compute the range predictions so that the range predictions mirror the range measurements at each hypothetical position. The terrain heights are processed directly from the original database regardless of the flight path and without transformation of the database to the altitude or heading of the flight path. Terrain heights between database locations 16 can be calculated using an interpolation technique such as bilinear interpolation. The navigation processor periodically updates search space 26 over the measurement history, which tends to grow with time due to the integration of errors in the IMU measurements that increases the uncertainty in the position estimate, and calculates range predictions for prior measurements for the portion of the search space added by the update. Over the history, each measurement will have a set of range predictions corresponding to the final search space. It is important that the search space and grid are updated to account for any growth of the position error over the measurement history. If the distance between the true position of the vehicle and the estimated position drifts outside of the original uncertainty basket, then the algorithm will still correlate to the correct solution.

The navigation processor performs a correlation between the history of range measurements and range predictions to determine a correlation offset within the search space according to a correlation metric such as the Mean Absolute Difference (MAD), the Mean Square Difference (MSD), or a Moving Variance (step 38). The MAD correlation metric selects the correlation offset that minimizes the absolute differences between the range measurements and predictions over the history. The navigation processor suitably uses terrain sufficiency statistics to decide when there is sufficient terrain variation for a successful correlation. The navigation processor uses the history of measurements and predictions gathered since the initialization of the search space or, if more than $N_{max}$ measurements have been gathered since the initialization of the search space, uses a moving history of the latest $N_{max}$ measurements and corresponding predictions to compute terrain sufficiency statistics and also to compute the correlation metric. The navigation processor may perform the correlation from estimated vehicle position offsets sampled on a dense grid over the entire search space or may use an iterative process that centers the updated (and smaller) search space on the correlation offset while increasing the grid density. The navigation processor may implement a post-correlation least squares solution to adjust 15S the correlation offset to provide sub-correlation refinement of the horizontal position residual and to compute the altitude residual.

The navigation processor uses the correlation offset to generate a position estimate correction and to correct the uncertainty (step 40). The navigation processor can align the corrections in time to any point in the history. However, for the best performance the processor typically aligns the corrections to the center of the measurement history. The corrected uncertainty is used to initialize the search space for the next history. The navigation processor uses the position estimate correction to correct the position estimate (step 42) that is provided to other vehicle systems such as a navigation display or a guidance processor. The navigation processor repeats the process, suitably continuously, to dynamically update the search space and provide autonomous terrain aided navigation corrections as the vehicle flies over the terrain.

Figure 3:
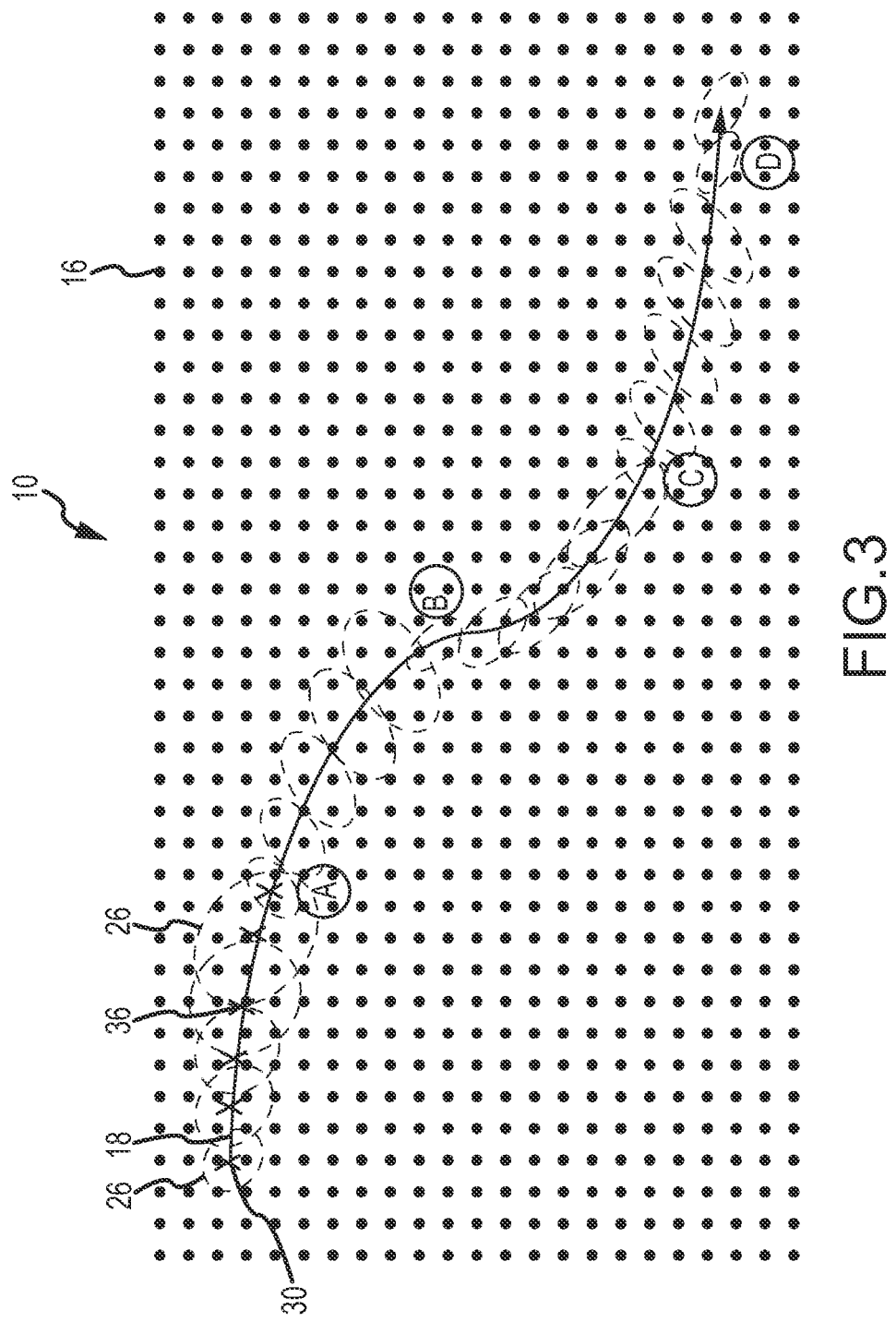
FIG. 3 is a diagram of an embodiment of a terrain database that is formatted independently of a flight-path and a dynamically updated search space along a vehicle flight path.
Figure 4:
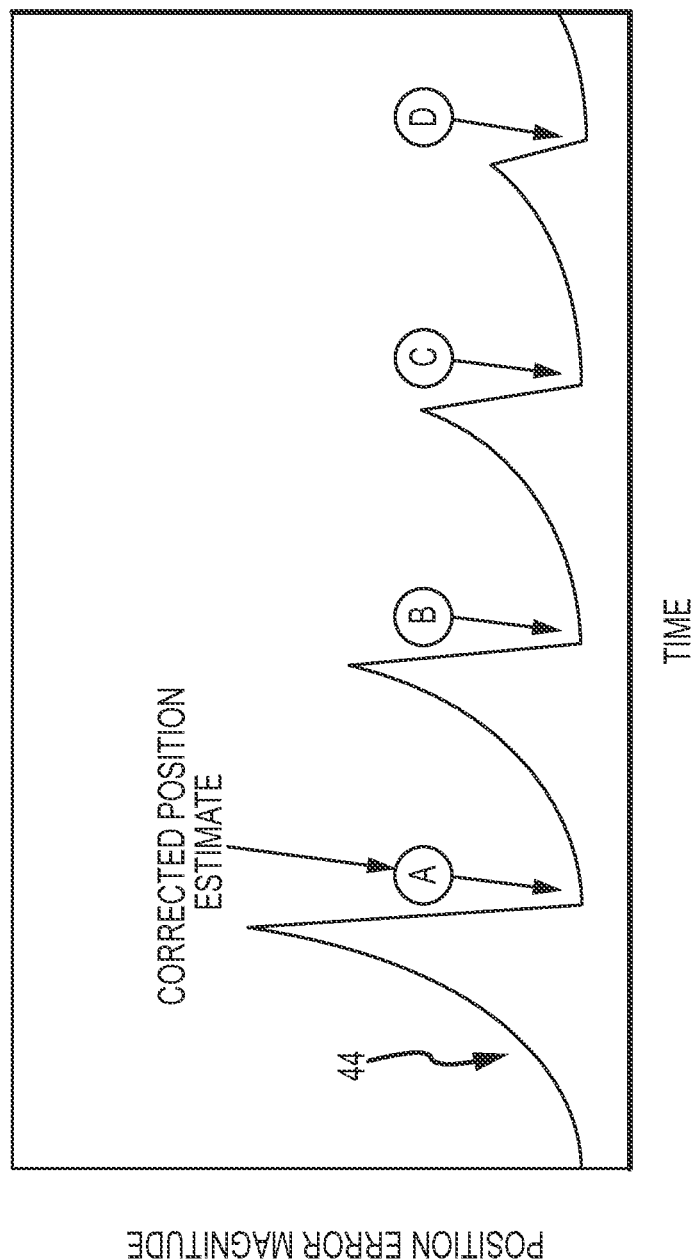
FIG. 4 is a plot of horizontal position error growth with IMU drift and error reduction from terrain aided navigation corrections.

Referring specifically to FIGS. 3 and 4, the magnitude 44 of the horizontal position error grows due to IMU drift. This is reflected in the increasing size of search space 26. The navigation processor incorporates the AROTAN corrections at Times A, B, C and D. The corrections reduce the position error magnitude 44 and the uncertainty as reflected in the size of the search space 26. The uncertainty of the horizontal position estimate, hence the size of the search space, tends to grow while the history is gathered and is reduced upon correction.

Figure 5:
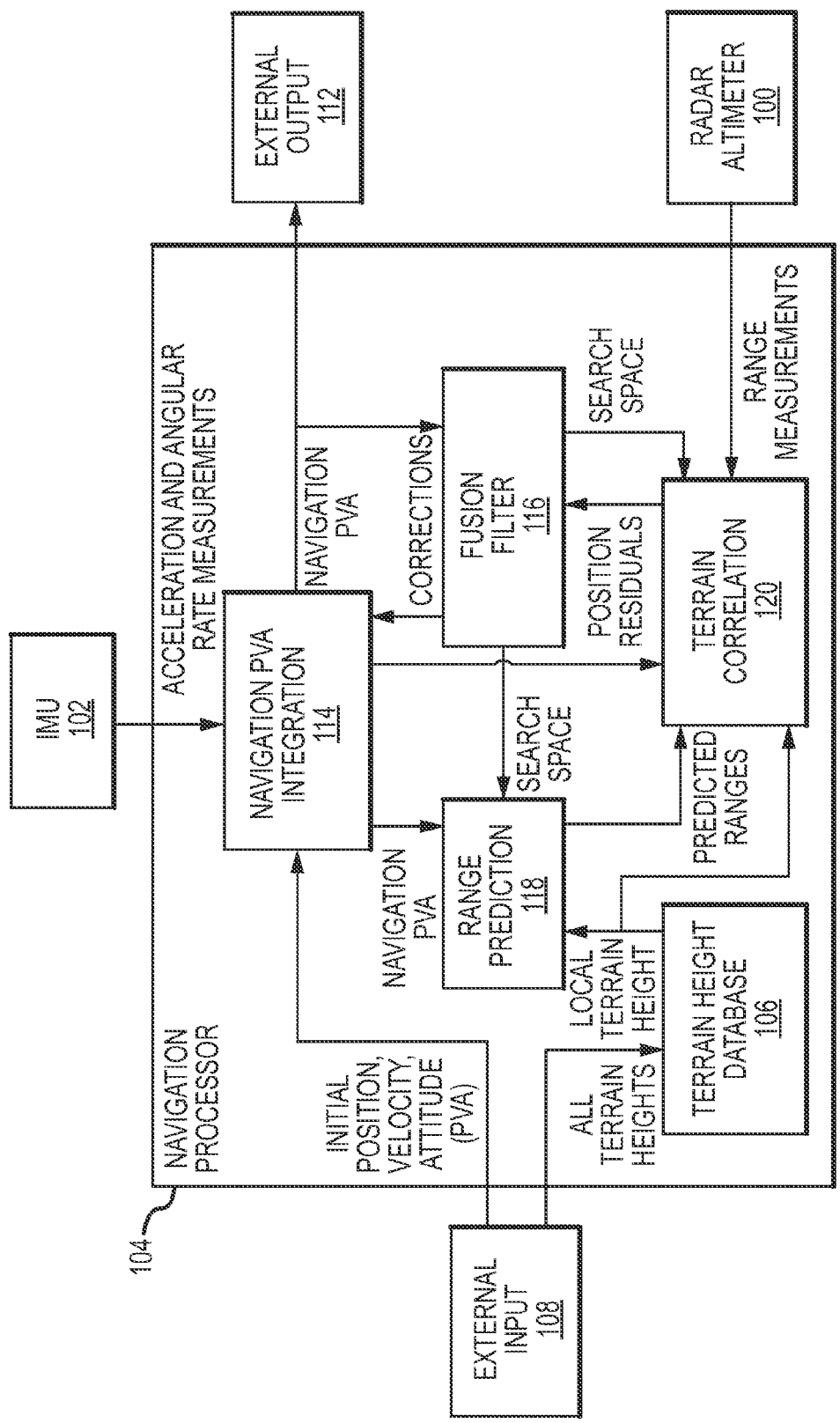
FIG. 5 is a hardware block diagram of an embodiment of a navigation processor for autonomous range-only terrain aided navigation.
Figure 6:
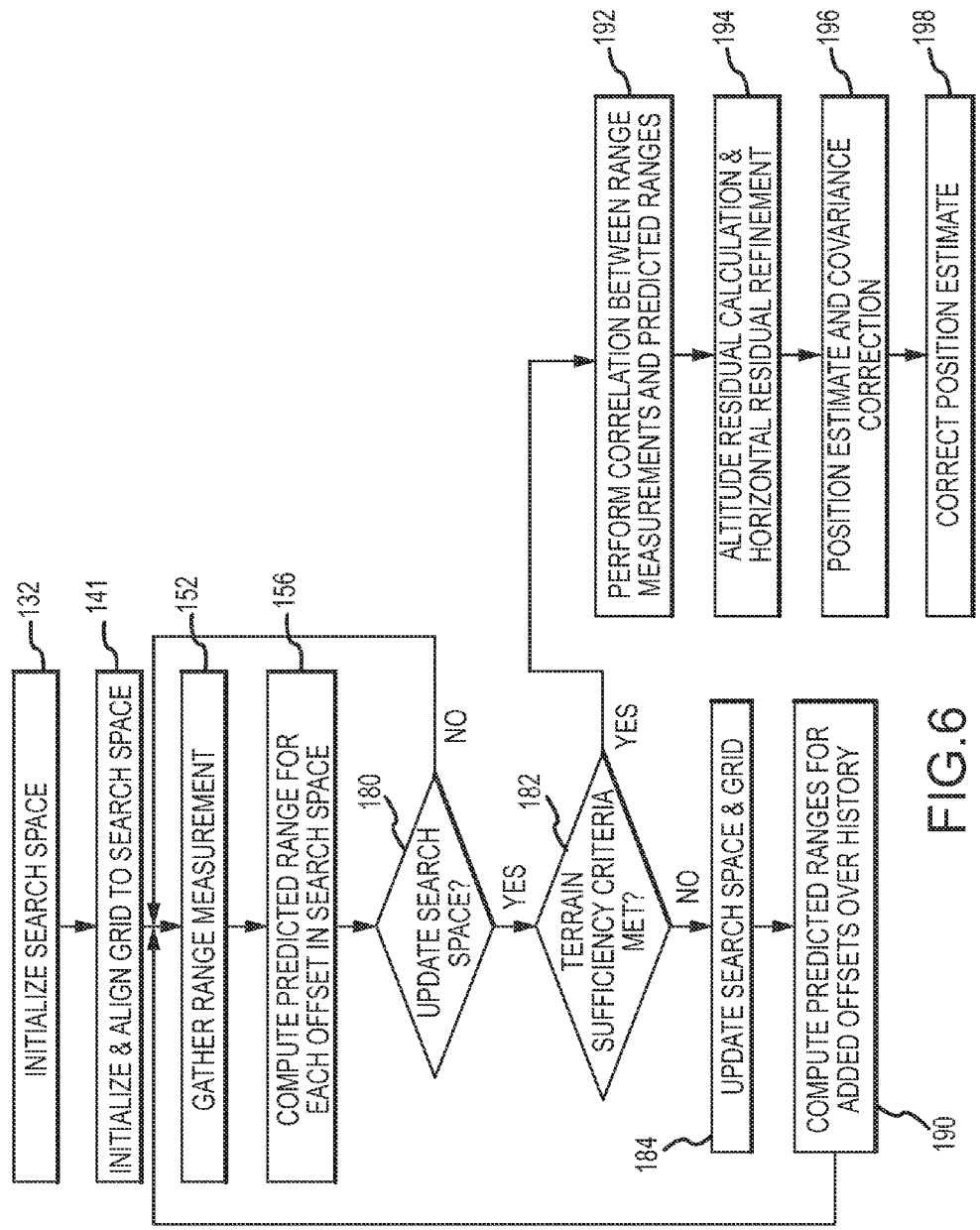
FIG. 6 is a flow diagram of an embodiment of autonomous range-only terrain aided navigation executed by the navigation processor.

Referring again to the drawings, another embodiment of Autonomous Range-Only Terrain Aided Navigation (AROTAN) is illustrated in FIGS. 5 through 10. As shown in FIG. 5. AROTAN can be implemented with a minimum hardware package available on most flight vehicles including a radar altimeter 100, an IMU 102, a navigation processor 104 and a terrain height database 106 stored in onboard memory. Navigation processor 104 receives initial position, velocity and attitude (PVA) from an external input 108 such as an operator interface or a transfer alignment process, range measurements 110 from the radar altimeter 100 at an altimeter clock rate (e.g. 25 Hz), and acceleration and angular rate measurements ("IMU measurements") at an IMU clock rate (e.g. 25 Hz to 100 Hz) and outputs navigation PVA at the IMU rate to an external output 112.

Navigation processor 104 is configured to implement several functional blocks. The core block is the Navigation PVA Integration 114 that receives the initial PVA and the IMU measurements and integrates these measurements to provide the navigation PVA including the horizontal position, altitude, velocity and attitude to the external output. Without correction, the error of the navigation PVA would continue to grow with drift in the IMU. The navigation processor blocks include a Fusion Filter 116 such as an extended Kalman filter (EKF) Range Prediction 118 and Terrain Correlation 120 that together receive as inputs the terrain height database, the range measurements and the uncorrected navigation PVA (e.g. the updated horizontal position estimate) and generate the corrections that are supplied to the Navigation PVA integration 114. The corrections include corrections for position, velocity attitude and IMU compensation terms and are provided roughly every 20 seconds or once every, 500 range measurements, depending on when the terrain sufficiency criteria are met. The Navigation PVA Integration 114 uses the IMU compensation terms to internally compensate the IMU accelerations and angular rates for IMU errors at the IMU rate and to adjust the position estimates by the position corrections.

Fusion Filter 116 receives the navigation PVA from Navigation PVA Integration 114 and positions residuals from Terrain Correlation 120 and outputs the search space at a filter rate (e.g. 1 Hz) and the corrections roughly every 20 seconds. An EKF uses estimates of position, velocity, attitude, accelerations and angular rates to compute a state transition matrix that is a function of differential equations that are a function of time, and uses the state transition matrix to project the covariance matrix to the time of the next EKF iteration so that the search space is updated at the EKF rate.

To produce the corrections and correct the covariance, the EKF uses the covariance matrix to compute a Kalman filter gain. The Kalman filter gain and the three-dimensional position residual are used to estimate the errors in the position, velocity, and attitude estimates and IMU compensation terms. These errors are used to compute corrections to be incorporated to the corresponding estimates in the Navigation PVA Integration. The Kalman filter gain is also used to correct the covariance matrix to reflect the change in uncertainty as a result of incorporation of the corrections from the position residual.

To improve performance, the corrections are preferably propagated back to the center of the measurement history. This is because the corrections were formed as a function of the measurements and predictions over the measurement history. This requires computing an inverse state transition matrix that propagates the error from the end of the measurement history backward to the center of the measurement history. Since the inverse state transition matrix, like the state transition matrix, is formed by summing or downsampling the navigation estimates over the propagation time interval, and since the length of the measurement history is not known until the terrain sufficiency criteria are met, this requires a moving history of the terms needed to compute the inverse state transition matrix to be stored. Then at the time of the error estimate and covariance correction, the inverse state transition matrix is computed over the time interval from the end of the measurement history back to the center of the measurement history. This inverse state transition matrix is used to propagate the Kalman measurement matrix (Kalman H matrix) back to the center of the measurement history, and this propagated measurement matrix is used in the Kalman error estimate and covariance correction computations.

Range Prediction 118 centers the search space on the updated horizontal position estimate, aligns a grid to the search space and retrieves local terrain heights from terrain height database to calculate range predictions and a full three-dimensional range vector for hypothetical vehicle positions on the grid at the current altitude at the altimeter rate. Range Prediction implements a model of the radar altimeter so that the range predictions are consistent with range measurements from the same position. As the search space grows while gathering the history, the Range Prediction adds indices to the grid to cover the search space and fills in range predictions for earlier measurements in the history. The orientation of the grid and the spacing of its indices remain fixed during the entire measurement history for each correlation.

Terrain Correlation 120 gathers a history of the range measurements $R_k$ and the predicted ranges $\hat{R}_{i,j_k}$, k=1, . . . , N, over the two-dimensional search space of hypothetical position offsets indexed by i and j at the altimeter clock rate and performs a correlation between the history of range measurements and the predicted ranges on the grid to determine the indices $i_{MAD}, j_{MAD}$ of a correlation offset that minimizes the correlation metric. Because not all terrain is suitable for a successful position correlation, to reduce the probability of a false correlation, Terrain Correlation computes terrain sufficiency statistics and compares the statistics against success criteria. When the terrain sufficiency criteria are met, the correlation is performed and the position residuals are provided to Fusion Filter 116. The terrain sufficiency statistics and correlation are suitably performed for a moving history that includes the last N measurements and corresponding predictions, where N is constrained to be not greater than the moving history length of $N_{max}$.

A variety of statistics can be used, including the well-known one-dimensional terrain roughness $\sigma_T$ and terrain slope variation $\sigma_Z$ used previously for TERCOM. These can be computed using terrain heights from the terrain height database, calculated at the estimated horizontal positions corresponding to the range measurements, with the slope for $\sigma_Z$ calculated in the direction of one or both of the search space axes over the grid spacing distance of the hypothetical position offsets. It can be appreciated by one of ordinary skill in the art that another technique available to determine the quality of the correlation is to check the values or the slopes of the correlation metric over the search space against one or more thresholds to find the boundary of the area most likely to contain the vehicle position given the measurements gathered thus far. The size of this boundary may be checked against sufficiency criteria. Whether one or more of these statistics are used, they are checked against criteria to determine whether there is sufficient probability of a successful correlation.

At any time that the terrain sufficiency criteria are met, AROTAN can proceed with the correlation. If the criteria are not met, then AROTAN proceeds with gathering another range measurement and computing the associated range predictions. A moving history of range measurements and corresponding range predictions is stored, and the terrain sufficiency statistics are updated to correspond with the range measurements in the moving history. That is, if the length of the history of range measurements and predictions reaches the maximum length $N_{max}$ of the moving history, and the terrain sufficiency criteria are still not met, then the oldest range measurement and predictions are discarded and the new measurement and predictions are added to the history and the statistics are computed for the new history. Since the statistics are sums, the updated statistic can be formed by subtracting the terms corresponding to the oldest measurements and adding the terms corresponding to the newest measurements since the statistics were last computed.

The moving history allows the position correlation to take place as soon as there is sufficient variation in the terrain with the latest range measurements. The maximum length of the moving history can be set based on computational or memory constraints, but more importantly, the moving history allows the measurement history to be kept from being so long that the growing navigation errors become too large for a good correlation.

Referring now to FIGS. 6 through 10, Fusion Filter 116 initializes a search space 130 (step 132). Search space 130 is a two-dimensional region inside which a search will be performed using a correlation metric for the most likely horizontal position of the vehicle. The search space is centered at the vehicle's current horizontal position estimate 134. Before the start of gathering a history of range measurements for each correlation, the boundary of the search space is initialized as a function of the latest horizontal position covariance. The position estimate is taken either from initial values given to the navigation position, velocity and attitude (PVA) integration function, or from values previously updated by that function, updated to the time of the first range measurement $R_1$ in the measurement history for the current correlation. Likewise the position covariance is taken either from initial values given to the fusion filter function or from values previously updated by that function, updated to the time of the first range measurement in the measurement history for the current correlation.

Figure 7B:
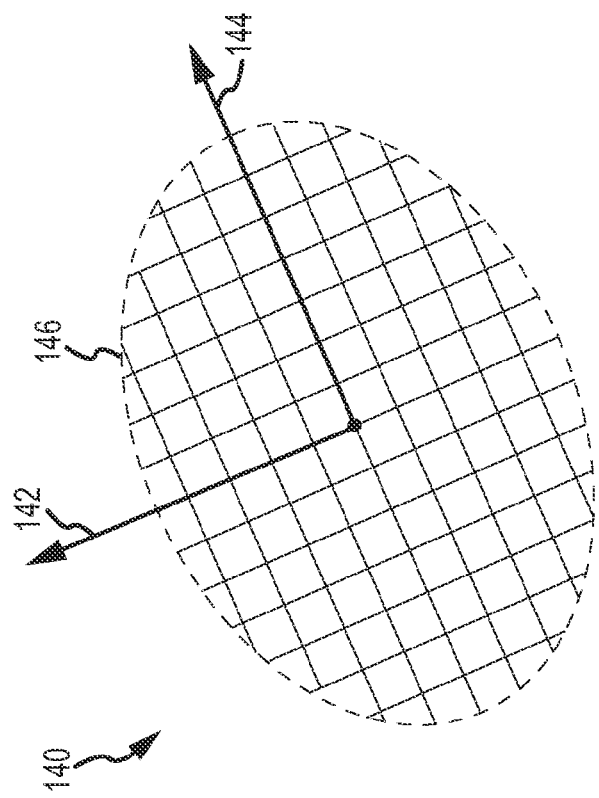
FIGS. 7a and 7b are diagrams of an initial search space and a grid aligned to the search space, respectively.
Figure 7A:
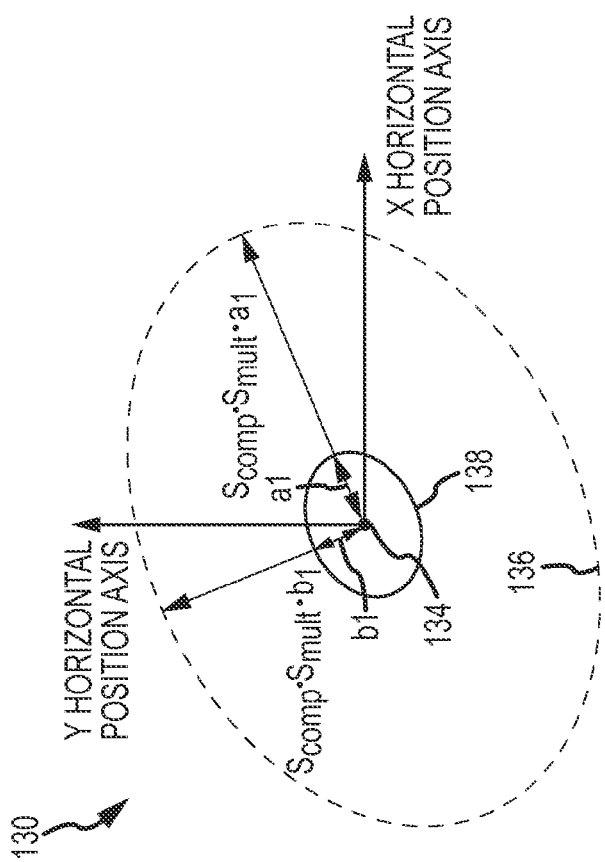

As shown in FIG. 7a, the search space boundary 136 is a function of the two-dimensional horizontal position covariance matrix, which defines an ellipse 138. The principal axes of the covariance ellipse, $a_1$ and $b_1$, which are the square roots of the eigenvalues of the horizontal position covariance matrix, are multiplied by a scalar, $s_{mult}$, to make the initial search space large enough to encompass the most likely vehicle position with sufficient confidence, and yet small enough to have a sufficiently low probability of a false correlation. In addition the axes may be multiplied by a computational ratio, $s_{comp}$ between 0 and 1 that determines the amount of processing that is done in the foreground at the altimeter rate relative and in the background at the EKF rate. Thus the search space boundary 136 is an ellipse with principal axes $s_{comp} \cdot s_{mult} \cdot a_1$ and $s_{comp} \cdot s_{mult} \cdot b_1$ at an angle (with respect to the horizontal position axes) that is a function of the off-diagonals of the covariance matrix. Alternatively, for ease of maintenance, the search space can be defined as a rectangle (or other geometric space) with dimensions large enough to encompass the elliptically defined search space.

Range Prediction 118 aligns a grid 140 to search space 130 (step 141) to divide the search space into a two-dimensional grid of hypothetical offsets from the horizontal estimated position as shown in FIG. 7b. The axes 142 and 144 of grid 140 are suitably aligned to the principal axes $s_{comp} \cdot s_{mult} \cdot a_1$ and $s_{comp} \cdot s_{mult} \cdot b_1$, of the search grid 130. The spacing between indices 146 along the axes of the grid defines the resolution of the correlation. The spacing is independent of the spacing of terrain height locations in the database, and is independent of the range measurement spacing. The indices 146 may be laid out on a rectangular grid with equal spacing along both axes as shown. Alternately, the indices could be defined radially on concentric ellipses or in any number of other ways. In order to perform the correlation effectively the orientation of the grid and the spacing of its indices should remain fixed for each correlation.

Figure 8:
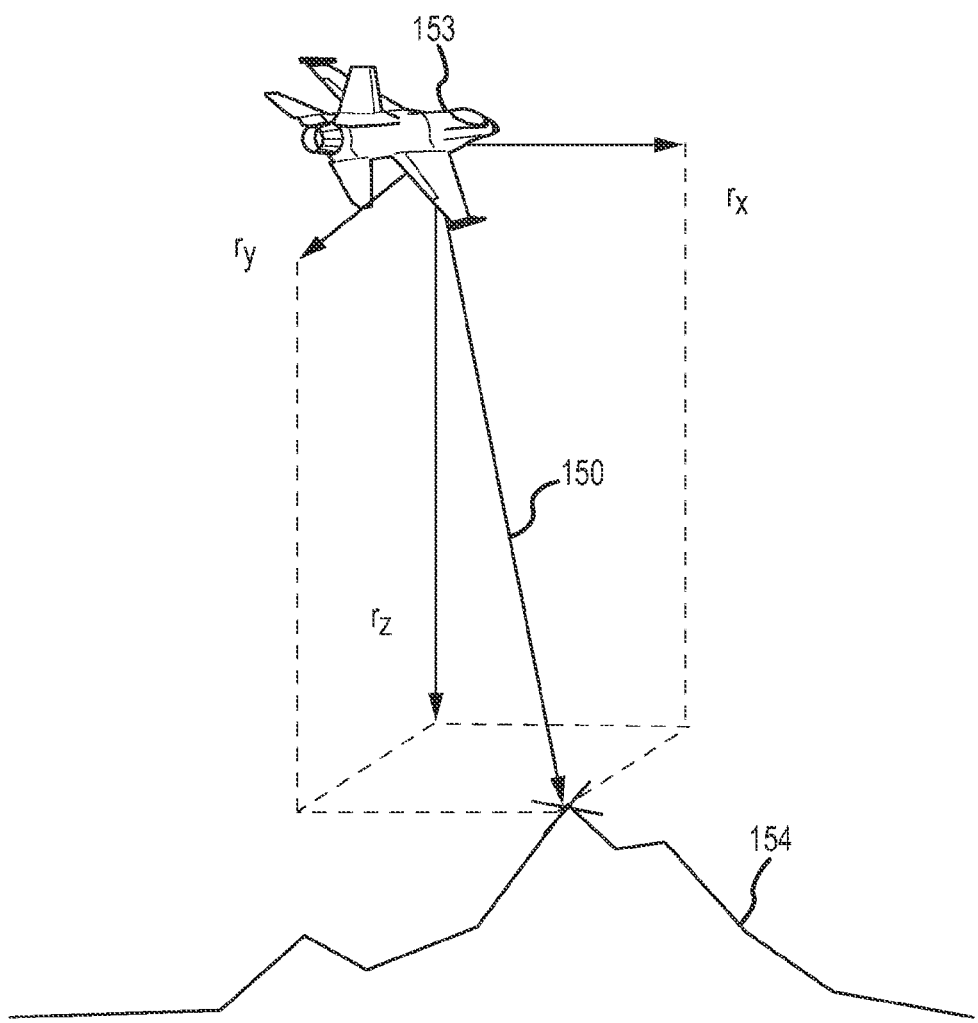
FIG. 8 is a diagram illustrating an embodiment of a moving history of horizontal position estimates and range measurements to the terrain.

Terrain Correlation 120 gathers a range measurement 150 (step 152). Each position correction of the AROTAN algorithm requires a history of range measurements to be gathered by the vehicle. Range measurements can be obtained using a relatively simple altimeter with a wide transmit beam. This sensor technology is well established and has been used extensively for TERCOM applications. Each range is the distance from the vehicle 153 to terrain in the vicinity of the vehicle. The radar altimeter needs to provide only the range. Radar altimeters typically measure the range 150 to the terrain 154 that is nearest to the vehicle, called the first return, as shown in FIG. 8. The full range vector $(r_X, r_Y, r_Z)$, which gives the three coordinates of the location on the terrain from which the radar altimeter registered the range measurement with respect to the vehicle, is not required. Equivalently, the azimuth and elevation angles from the radar altimeter antenna boresight to the range vector are not required. Hence, if only the range is used, there is no need for boresight calibration. However, as mentioned previously, if the radar altimeter is configured to provide the full range vector, then that information can be used as a measurement as well. A sequence or history of measurements sufficient for a successful correlation is gathered and stored in an array for computation of the correlation metric.

As each range measurement $R_k$ is gathered and stored, Range Prediction 118 computes predicted ranges corresponding to that range measurement over grid 140 (step 156). For each hypothetical position offset 158, indexed by i and j to cover the entire current search space, a predicted range $\hat{R}_{i,j_k}$ is calculated based on the hypothesis that the vehicle is located at that offset from the estimated position 160 along an estimated ground track 162. This involves first computing a hypothetical vehicle position by adding the hypothetical position offset 158 to the estimated position 160 corresponding to the time that the range measurement $R_k$ was gathered. Then Range Prediction 118 computes the three-dimensional vector between the hypothetical vehicle position and the terrain using the terrain database heights for a sufficiently dense set of points within the radar altimeter beam 164, and sufficiently accounting for radar altimeter measurement effects such as the direction the radar beam is pointed, antenna gain pattern, terrain reflectivity, filtering and tracking. The predicted range is then computed as the magnitude of this three-dimensional range vector, resulting in one predicted range for each hypothetical vehicle position within the search space.

Figure 9:
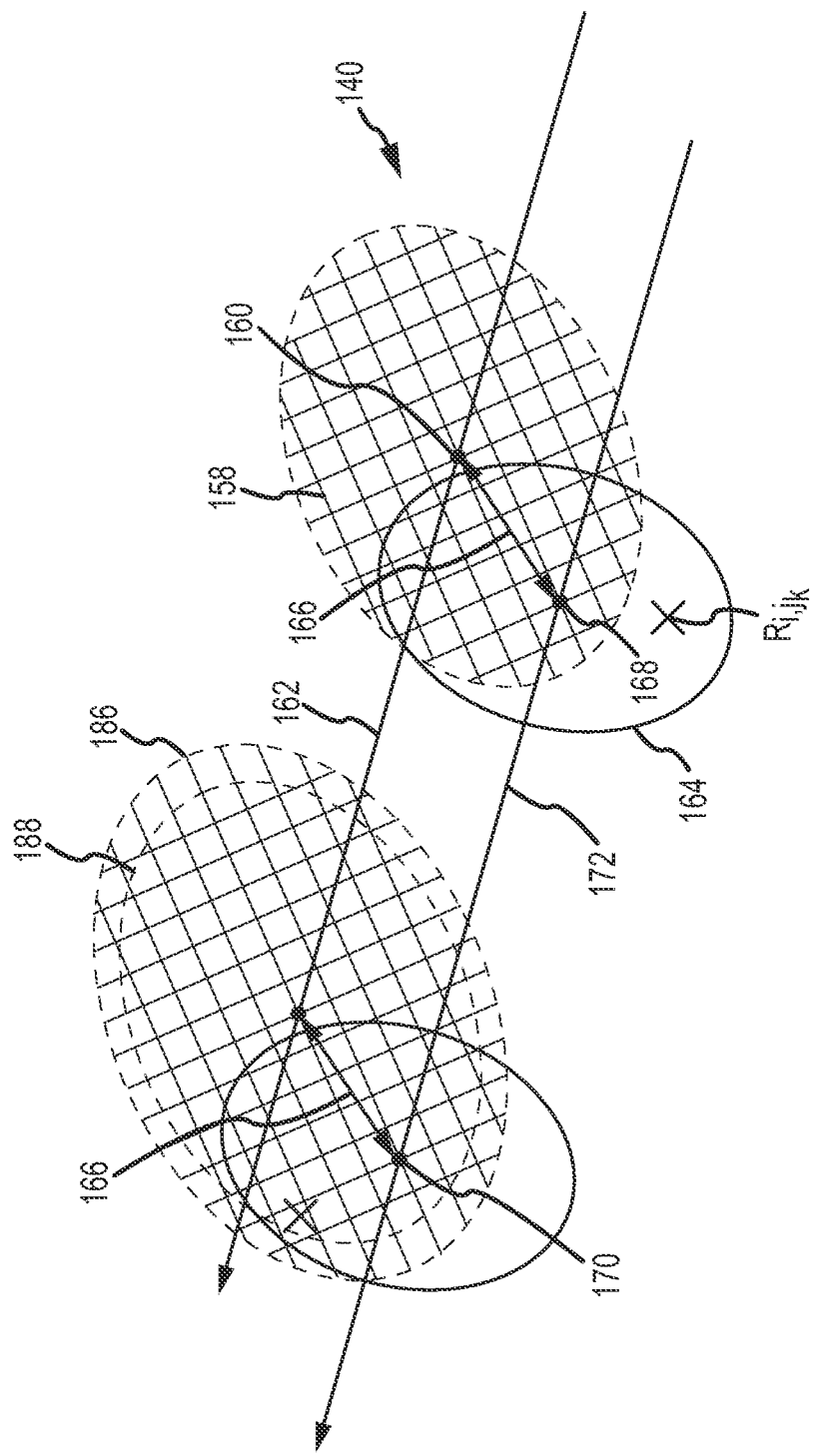
FIG. 9 is a diagram illustrating range predictions for a particular vehicle position on the grid at two points in the history and illustrating the dynamic updating of the search space.

FIG. 9 illustrates a predicted range for each of two range measurements, for one particular hypothetical vehicle position offset 166 that produces hypothetical positions 168 and 170 along a hypothetical ground track 172. Note that it is possible for the terrain location of the predicted range to occur outside of the search space, since the search space only defines the possible horizontal locations of the vehicle. All of the predicted ranges $\hat{R}_{i,j_k}$ are stored along with the corresponding range measurement $R_k$ to prepare for the computation of the correlation metric. The full three-dimensional vectors of the predicted ranges, $$(\hat{r}_{X_{i,j_k}}, \hat{r}_{Y_{i,j_k}}, \hat{r}_{Z_{i,j_k}}),$$

are also stored.

After each range measurement is gathered and the position estimate and covariance are used to calculate all range predictions over the search space associated with the current range measurement, the position estimate needs to be updated to the time of the next range measurement $R_{k+1}$. Navigation PVA Integration 114 updates the position estimate using accelerations and angular rates from IMU 102. Due to effects such as IMU accelerometer bias and gyro drift, the position error grows during the collection of the radar altimeter measurement history. Therefore, the covariance matrix needs to be updated as a function of time to reflect these error effects. The covariance matrix is updated by the Fusion Filter 116, for example through the use of a time update in an extended Kalman filter, generally running at a lower filter rate than the radar altimeter measurement rate. Fusion Filter 116 determines if it is time to update the search space (step 180). If not, the navigation processor continues to gather the history of range measurements and range predictions in steps 152 and 154.

If the navigation processor determines that it is time to update the search space, Terrain Correlation 120 computes the terrain sufficiency statistics for the history and determines whether the terrain sufficiency criteria are met (step 182). If Terrain Correlation 120 determines that the terrain sufficiency criteria are not met and thus more range measurements are needed for the current correlation, Fusion Filter 116 updates the search space and Range Prediction 118 adds indices to the grid to cover the search space without changing the orientation of the grid or the spacing of its indices (step 184). To update the search space, the Fusion Filter 116 updates the covariance, and the new principal axes $a_{k+1}$ and $b_{k+1}$ of the ellipse associated with the new horizontal position covariance matrix are multiplied by the search space scaling constants to give the principal axes $r_{comp} \cdot s_{mult} \cdot a_{k+1}$ and $r_{comp} \cdot s_{mult} \cdot b_{k+1}$ of the new elliptical search space for the next range measurement.

The updated position covariance reflects any increase in position uncertainty due to IMU drift. As a result, when the search space boundary is updated the new boundary 186 may expand large enough to contain hypothetical position offsets 188 that were not in the previous search space, as shown in FIG. 9. If the new search space excludes hypothetical position offsets that were in the previous search space, the new search space is expanded to include those offsets. Range predictions must be calculated for each range measurement in the entire correlation measurement history, for each offset in the entire search space over which the correlation metric will be computed (step 190). Consequently, before the range predictions are calculated for the new range measurement, range predictions need to be calculated for the new hypothetical position offsets in the new search space, for each range measurement stored in the measurement history array up to the current time, from $R_1$ to $R_k$.

To scale how much processing is performed after each range measurement and how much is saved to be performed at the time of the correlation processing, the computational ratio $s_{comp}$ can be set to a value between 0 and 1. If $s_{comp}$ is set to 1, then the range predictions are performed for the current full search space after reach range measurement is gathered, and no additional range prediction calculations are required at the time of correlation processing. At the other end of the scale, if $s_{comp}$ is set to 0, then no range predictions are performed until just prior to correlation processing, at which time all of the range predictions have to be computed for the final search space over the entire measurement history. Intermediate values of $s_{comp}$ define the proportion of range prediction computation that is performed after each range measurement. The processing at the time of the correlation can be performed in processing background.

Once the terrain sufficiency criteria are met (step 182), Terrain Correlation 120 performs a correlation between the range measurement and the predicted ranges over the history (step 192). The correlation may be performed over the history from the first range measurement until the criteria is met with less than $N_{max}$ measurements or over a moving history of the last $N_{max}$ measurements.

When the terrain sufficiency criteria are met, there is available a history of range measurements $R_k$, $k=1, \ldots, N$, along with the corresponding range predictions $\hat{R}_{i,j_k}$, $k=1, \ldots, N$, over the final two-dimensional search space of hypothetical position offsets indexed by i and j. These values are used to compute a two-dimensional correlation metric to identify the pair of indices (i,j) that provide the best correlation of the range predictions to the range measurements over the history. The indices and spacing provide the correlation offset. There are any number of correlation metrics that may be used. In this embodiment, the Mean Absolute Difference (MAD) metric is issued. In an alternate embodiment, the computation of the correlation metric may take place incrementally as each range measurement is gathered using a Moving Variance correlation metric.

To compute the MAD correlation metric, the mean of the range measurements is computed, $$\overline{R} = \frac{1}{N}\sum_{k=1}^{N} R_k.$$

For each of the hypothetical position offsets in the search space, the mean of the range predictions is computed, $$\overline{\hat{R}}_{i,j} = \frac{1}{N}\sum_{k=1}^{N} \hat{R}_{i,j_k}.$$

The correlation metric is then computed over the search space, indexed by i and j using the following formula;

$$MAD_{i,j} = \sum_{k=1}^{N} \left| (R_k - \overline{R}) - (\hat{R}_{i,j_k} - \overline{\hat{R}}_{i,j}) \right|$$

The indices, $i_{MAD}, j_{MAD}$, of the minimum of all of these sums is taken to indicate the horizontal offset corresponding to the actual position of the vehicle.

This offset, $\Delta \vec{x}_{COR}$, called the correlation offset, is the output from the correlation. For the example of a rectangular grid, the correlation offset is calculated as follows.

$$\Delta \vec{x}_{COR} = i_{MAD} \cdot \Delta \vec{a} + j_{MAD} \cdot \Delta \vec{b}$$

Terrain Correlation 120 may perform the correlation from range predictions sampled on a dense grid over the entire search space or may use an iterative process that centers the corrected (and smaller) search space on the correlation offset from the previous while increasing the grid density. The alignment of the grid to the search space and the spacing of its indices may be changed with each iteration but remain fixed during an iteration. The iterative approach may be computationally more efficient and provide high resolution of the final correlation offset. The iteration may be terminated based on any one of a number of criteria including a fixed number of iterations, a minimum change in the correlation offset, a minimum spacing etc.

To provide an altitude correction and to further improve the accuracy of the horizontal position correction, Terrain Correlation 120 may perform a residual refinement technique after each correlation process is complete (step 194). When the correlation offset is found, the corresponding history of predicted range magnitudes, $\hat{R}_{COR_k} = \hat{R}_{i_{MAD},j_{MAD}}$, $k=1, \ldots, N$, and the corresponding full three-dimensional predicted range vectors, $$(\hat{r}_{X_{COR_k}}, \hat{r}_{Y_{COR_k}}, \hat{r}_{Z_{COR_k}}),$$

$k=1 \ldots, N$, are selected using the indices of the correlation offset, $i_{MAD}, j_{MAD}$. From these are computed the N by 1 vector $\Delta R = R_k - \hat{R}_{COR_k}$, $k=1, \ldots, N$ of differences between the measured ranges and predicted ranges, and the N by 3 matrix of three-dimensional line-of-sight unit vectors, $$U = \begin{bmatrix} \hat{r}_{X_{COR_1}}/\hat{R}_{COR_1} & \hat{r}_{Y_{COR_1}}/\hat{R}_{COR_1} & \hat{r}_{Z_{COR_1}}/\hat{R}_{COR_1} \\ \vdots & \vdots & \vdots \\ \hat{r}_{X_{COR_N}}/\hat{R}_{COR_N} & \hat{r}_{Y_{COR_N}}/\hat{R}_{COR_N} & \hat{r}_{Z_{COR_N}}/\hat{R}_{COR_N} \end{bmatrix},$$

in the directions of the predicted ranges corresponding to the correlation offset. These differences and line-of-sight vectors are used to compute a least squares solution, which corresponds to the three-dimensional offset from the correlation offset that minimizes the squares of the differences over the history. This offset, $\Delta \vec{x}_{LS}$, called the least squares offset, is computed as follows.

$$\Delta \vec{x}_{LS} = (U^T U)^{-1} U^T \Delta R$$

This is similar to the triangulation process used with GPS, but instead of ranges to satellites, the ranges to the terrain are used. The vertical component of the least squares solution provides the altitude residual applied by the fusion filter. The horizontal components provide a refinement to the correlation offset obtained from the correlation metric. The final residual is computed as follows.

$$\Delta \vec{x} = \begin{bmatrix} \Delta \vec{x}_{COR_X} \\ \Delta \vec{x}_{COR_Y} \\ 0 \end{bmatrix} + \begin{bmatrix} \Delta \vec{x}_{LS_X} \\ \Delta \vec{x}_{LS_Y} \\ \Delta \vec{x}_{LS_Z} \end{bmatrix}$$

Fusion Filter 116 uses the three-dimensional position residual, $\Delta \vec{x}$, to generate the corrections to the estimated position of the vehicle and to correct the covariance matrix to reflect the change in uncertainty as a result of incorporation of the corrections from the position residual (step 196). In order to properly correct the position estimate and covariance, the corrections must be propagated back to the center of the measurement history as previously described. Navigation PVA Integration 114 receives the corrections and incorporates them into the internal IMU compensation terms and the Navigation PVA that is provided to the external output (step 198). As previously mentioned, if measurements of the full range vector (e.g. angle as well as range) are provided by non-conventional radar altimeter, one configured to provide both range and bearing angle, these measurements can be used along with the adaptive search space methodology and terrain sufficiency criteria to provide a fully autonomous terrain aided navigation solution that needs no mission dependent terrain maps.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method for autonomous terrain aided navigation of an airborne vehicle, comprising the steps of:
  a) loading a terrain height database comprising heights of terrain at given locations from a terrain reference onto the vehicle, said database formatted independently of a flight path of the airborne vehicle over the terrain;
  b) initializing a two-dimensional search space about a horizontal position estimate of the airborne vehicle based on an uncertainty of the horizontal position estimate; and
during flight of the airborne vehicle,
  c) using a radar altimeter and an inertial measurement unit (IMU) to gather a history of range-only measurements from the vehicle to the terrain and for each range measurement calculating range predictions from an updated altitude estimate and from terrain heights in the database for positions of the vehicle on an indexed grid aligned to the search space about an updated horizontal position estimate, and updating said search space based on the uncertainty of the updated horizontal position estimate;
  d) performing a correlation between the history of range-only measurements and the range predictions to determine a correlation offset on the grid, the orientation of the grid and spacing of the grid indices being fixed over the history for each said correlation;
  e) using the correlation offset to generate a position estimate correction to correct the horizontal position estimate of the vehicle and to correct its uncertainty; and
  f) using the horizontal position estimate to provide autonomous terrain aided navigation corrections to the flight of the airborne vehicle as the vehicle flies over the terrain.

2. The method of claim 1, wherein the range predications are calculated directly from the terrain heights in the database without transformation of the database to the altitude or heading of the flight path.

3. The method of claim 1, further comprising:
  one or more times over the history, computing a covariance matrix for the horizontal position estimate as its uncertainty to autonomously update the search space;
  without changing the orientation or spacing of the grid, adding indices to the grid to cover the search space; and
  calculating range predictions for any additional indices in the grid for earlier horizontal position estimates in the history.

4. The method of claim 3, wherein the grid is aligned to the search space for each said history by,
  computing the covariance matrix at or just prior to starting to gather the history;
  computing first and second eigenvectors of the covariance matrix to define first and second principal axes of the search space for the horizontal position estimate;
  computing the first and second eigenvalues of the covariance matrix and multiplying them by a scale factor to determine an initial size of the search space;
  aligning axes of the grid to the first and second principal axes of the search space; and
  defining the spacing between indices along the axes of the grid.

5. The method of claim 1, further comprising:
  computing a terrain sufficiency statistic for the history from the terrain heights at the updated horizontal position estimate or from a correlation metric; and
  performing the correlation when the terrain sufficiency statistic satisfies a terrain sufficiency criteria.

6. The method of claim 5, wherein the terrain sufficiency statistic is computed for a moving window of the history that includes the last N range-only measurements where N is not greater than a chosen maximum length $N_{max}$ of the moving history, wherein the correlation is performed between only the last N range-only measurements and the last N range predictions.

7. The method of claim 1, further comprising:
  using the correlation offset to select a correlation history of range predictions and corresponding three-dimensional range prediction vector;
  computing a difference vector between the range measurements and the selected range predictions;
  computing line-of-sight unit vectors from the three-dimensional range prediction vector and correlation history of range predictions;
  using the difference vector and the line-of-sight unit vectors to compute a three-dimensional offset from the correlation offset that minimizes the squares of the differences over the history; and
  adding the three-dimensional offset to the correlation offset to provide a correction to the horizontal position estimate and the altitude estimate of the vehicle.

8. The method of claim 1, further comprising calculating the range predictions and performing the correlation iteratively by updating the search space with the corrected uncertainty, repositioning the search space about the correlation offset and reducing the spacing between grid indices.

9. The method of claim 1, further comprising:
prior to flight, programming the vehicle with a flight path; and
without reformatting for the flight path, loading the terrain height database onto the vehicle.

10. The method of claim 1, wherein the terrain height database is formatted by latitude and longitude.

11. The method of claim 1, further comprising:
updating the horizontal position estimate at a radar altimeter clock rate;
updating the correction and uncertainty of the horizontal position estimate at a filter clock rate less than or equal to the radar altimeter clock rate, and
performing the correlation upon satisfaction of a terrain sufficiency criteria synchronized to the filter clock rate.

12. The method of claim 1, wherein the range-only measurements provided by the radar altimeter represent a first return, wherein the range predictions are computed to model the first return.

13. A method for autonomous terrain aided navigation of an airborne vehicle, comprising the steps of:
a) loading a terrain height database comprising heights of terrain at given locations from a terrain reference onto the vehicle, said database formatted independently of a flight path of the airborne vehicle over the terrain;
b) initializing a search space based on a covariance of a horizontal position estimate;
c) initializing and aligning an indexed grid to the search space;
d) using a radar altimeter and an inertial measurement unit (IMU) to gather a moving history of the last N range measurements from the vehicle to the terrain at a radar altimeter clock rate, where N is not greater than a chosen maximum length $N_{max}$ of the moving history;
e) receiving an updated horizontal position estimate and an updated altitude estimate of the vehicle at the radar altimeter clock rate;
f) without transformation of the database to the altitude or heading of the flight path of the vehicle, calculating range predictions at the radar altimeter clock rate from the updated altitude estimate and terrain heights in the database for positions of the vehicle on the indexed grid about the updated horizontal position estimate;
g) updating the covariance and the search space at a filter clock rate less than or equal to the radar altimeter clock rate;
h) adding indices to the grid to cover the updated search space and calculating range predictions for each measurement in the moving history for the added indices;
i) computing a terrain sufficiency statistic for the moving history from the terrain heights or from a correlation metric, if the statistic satisfies terrain sufficiency criteria, performing a correlation between the moving history of range measurements and the last N range predictions on the grid to determine grid indices of a correlation offset, the orientation and spacing of the grid being fixed over the history for each said correlation;
j) using the correlation offset to provide a correction to the horizontal position estimate of the vehicle and to correct the covariance;
k) resetting the history of range-only measurements with each said correlation; and
l) using the horizontal position estimate to provide autonomous terrain aided navigation corrections to the flight of the airborne vehicle.

14. The method of claim 13, wherein the grid is aligned to the search space for each said history by,
computing the covariance matrix at or just prior to starting to gather the history;
computing first and second eigenvectors of the covariance matrix to define first and second principal axes of the search space for the horizontal position estimate;
computing the first and second eigenvalues of the covariance matrix and multiplying them by a scale factor to determine an initial size of the search space;
aligning axes of the grid to the first and second principal axes of the search space; and
defining the spacing between indices along the axes of the grid.

15. The method of claim 13, further comprising:
using the correlation offset to select a correlation history of range predictions and corresponding three-dimensional range prediction vector;
computing a difference vector between the range measurements and the selected range predictions;
computing line-of-sight unit vectors from the three-dimensional range prediction vector and correlation history of range predictions;
using the difference vector and the line-of-sight unit vectors to compute a three-dimensional offset from the correlation offset that minimizes the differences over the history; and
adding the three-dimensional offset to the correlation offset to provide a correction to the horizontal position estimate and the altitude estimate of the vehicle.

16. The method of claim 13, wherein the moving history of measurements comprises only range measurements.

17. A method for autonomous terrain aided navigation of an airborne vehicle, comprising the steps of:
a) loading a terrain height database comprising heights of terrain at given locations from a terrain reference onto the vehicle, said database formatted independently of a flight path of the airborne vehicle over the terrain;
b) initializing a search space based on an uncertainty of a horizontal position estimate;
c) using a radar altimeter and an inertial measurement unit (IMU) to gather a moving history of the last N horizontal position estimates, altitude estimates and range measurements from the vehicle to the terrain at a radar altimeter clock rate and, where N is not greater than a chosen maximum length $N_{max}$ of the moving history, without transformation of the database to the altitude or heading of the flight path of the vehicle, calculating range predictions from the altitude estimate and the terrain heights in the database for positions of the vehicle in the search space about each said horizontal position estimate;
d) one or more times during the moving history, updating the search space based on a growing uncertainty of the horizontal position estimate and calculating range predictions for each measurement in the moving history for the additional search space;
e) computing a terrain sufficiency statistic for the moving history from the terrain heights or from a correlation metric, if the statistic satisfies terrain sufficiency criteria, performing a correlation between the moving history of range measurements and the last N range predictions on the grid to determine a correlation offset;
f) using the correlation offset to provide a correction to the horizontal position estimate of the vehicle and to correct its uncertainty;

g) resetting the moving history of range measurements with each said correlation; and h) using the horizontal position estimate to provide autonomous terrain aided navigation corrections to the flight of the airborne vehicle.

18. The method of claim 17, further comprising:

using the correlation offset to select a correlation history of range predictions and corresponding three-dimensional range prediction vector;

computing a difference vector between the range measurements and the selected range predictions;

computing line-of-sight unit vectors from the three-dimensional range prediction vector and correlation history of range predictions;

using the difference vector and the line-of-sight unit vectors to compute a three-dimensional offset from the correlation offset that minimizes the differences over the history; and adding the three-dimensional offset to the correlation offset to provide a correction to the horizontal position estimate and the altitude estimate of the vehicle.

19. The method of claim 17, wherein the computation of the range predictions and the correlation are performed iteratively about the correlation offset with a decreasing and more finely resolved search space.

20. The method of claim 17, wherein the moving history of measurements comprises only range measurements.

21. An autonomous terrain aided navigation system for an airborne vehicle, comprising:

a terrain height database comprising heights of terrain at given locations from a terrain reference onto the vehicle, said database formatted independently of a flight path of the airborne vehicle over the terrain;

a radar altimeter and inertial measurement unit (IMU) configured to gather a history of range-only measurements from the vehicle to the terrain; and one or more processors configured to receive an initial two-dimensional search space about a horizontal position estimate of the airborne vehicle based on an uncertainty of the horizontal position estimate and, during flight of the airborne vehicle, for each range measurement to calculate range predictions from an updated altitude estimate and from terrain heights in the database for positions of the vehicle on an indexed grid aligned to the search space about an updated horizontal position estimate, and update said search space based on the uncertainty of the updated horizontal position estimate, perform a correlation between the history of range-only measurements and the range predictions to determine a correlation offset on the grid, the orientation of the grid and spacing of the grid indices being fixed over the history for each said correlation, and to use the horizontal position estimate to provide autonomous terrain aided navigation corrections to the flight of the airborne vehicle as the vehicle flies over the terrain.

* * * * *